Aug. 6, 1957 R. L. SPEAR 2,802,144

APPARATUS AND METHOD FOR CONTROLLING CAMERA KEYLIGHTS

Filed June 30, 1955 2 Sheets-Sheet 1

INVENTOR.
ROBERT L. SPEAR

BY L. S. Saulsbury

ATTORNEY

APPARATUS AND METHOD FOR CONTROLLING CAMERA KEYLIGHTS

Filed June 30, 1955 2 Sheets-Sheet 2

INVENTOR.
ROBERT L. SPEAR
BY
L. S. Saulsbury
ATTORNEY

United States Patent Office 2,802,144 Patented Aug. 6, 1957

2,802,144

APPARATUS AND METHOD FOR CONTROLLING CAMERA KEYLIGHTS

Robert L. Spear, Flushing, N. Y., assignor to Henry R. Alexander, New York, N. Y.

Application June 30, 1955, Serial No. 519,043

5 Claims. (Cl. 315—159)

This invention relates to the apparatus for and method of controlling the camera key lights of motion pictures or television.

When lighting a motion picture set, a single key light is used to illuminate the actor while several other lights are used to illuminate the scenery and background. This light is placed near the camera and determines the necessary flattery, mood and quality of the picture. When the camera is turned off, and moved to another position, the key light is moved with the camera to obtain the same flattery of light for taking the picture in the new position. Key lighting has been practiced for years in making motion pictures and accounts for the high quality photography that has resulted.

With the advent of television, a new system of lighting has become necessary. Since several cameras are used on a television set that are turned on and off many times while televising a scene, it is impractical to move the key light to a new position every time a new camera is turned on and off. Therefore, it has become necessary to use a system of lighting which either does not employ key lights at all, or, if key lights are used, they have to be located at different positions on the set, and heretofore all of them have had to be kept lighted during the entire shooting of the scene. Harsh cross lighting, inconsistent with good lighting practice, has resulted. This same condition has been present even with motion pictures that are made for use on television with several cameras shooting on the set at the same time.

It is accordingly the principal object of the present invention to provide a system of key lighting that is adapted for use in television or motion pictures wherein the several key lights located at the different camera positions will be turned on and off automatically, or semi-automatically, one at a time, as the cameras are turned on and off, and thereby render possible a single key light system with the multiple cameras used on television or motion pictures.

It is another object of the invention to provide a key light board for a multiple key light system for use with television or motion pictures on which the sequence of operation of the several key lights may be pre-selected in advance of or during the shooting of the scene and that will be automatically turned on and off through the camera dissolver board, or the turning on or off of a motion picture camera.

It is still another object of the invention to provide in the equipment for carrying out the above multiple key lighting system for television and motion pictures that is not electrically connected with the camera dissolver board but with a photo-electric pickup device placed under the camera dissolver board, or attached to a motion picture camera.

Other objects of the invention are to provide a control apparatus for multiple key light system to be used in connection with television or motion pictures having the above objects in mind which is of simple construction, inexpensive to manufacture, easy to install and operate, compact and efficient in operation.

For other objects and a better understanding of the invention, reference may be had to the following detailed description taken in connection with the accompanying drawing, in which.

Figure 1:
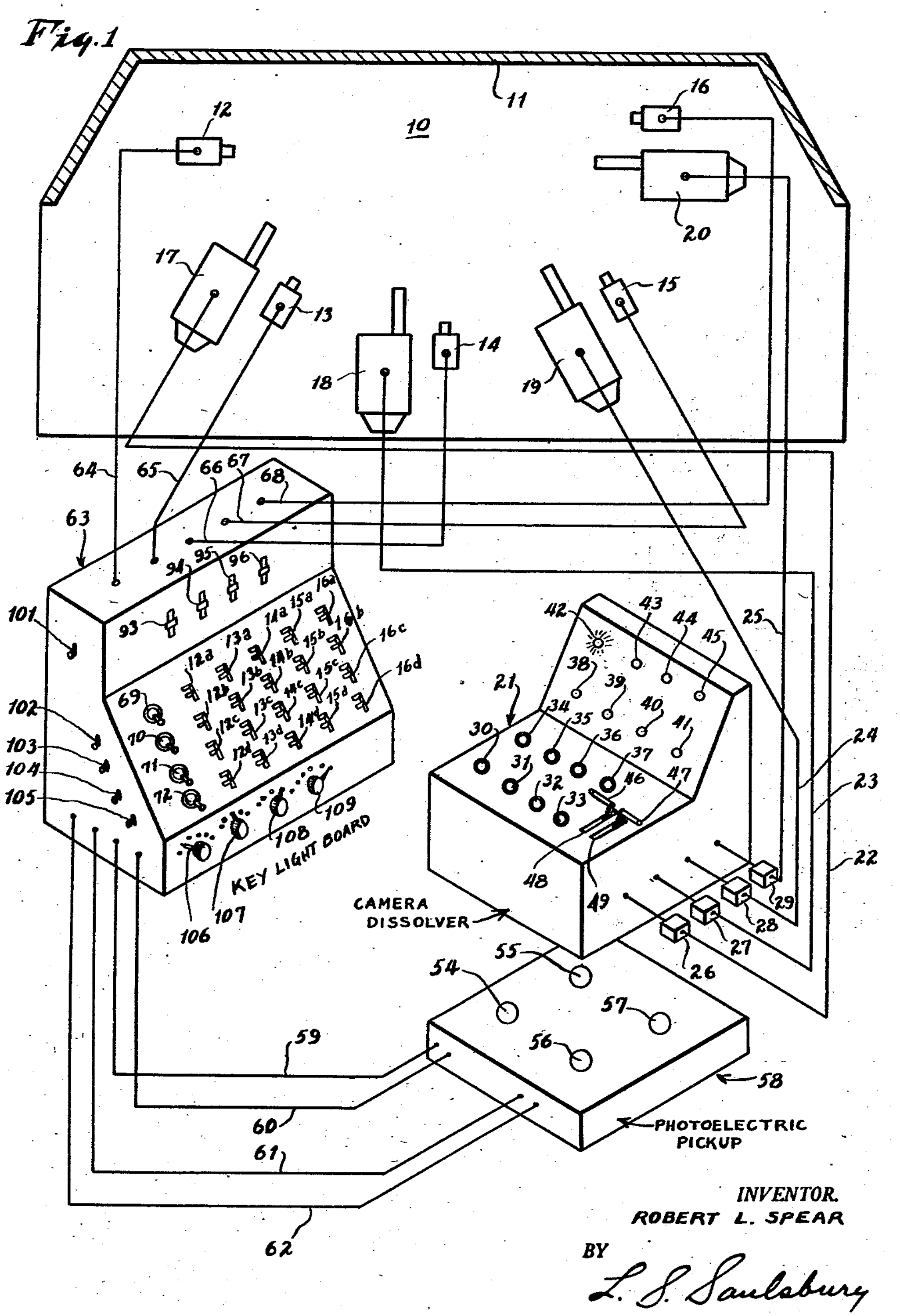
Figure 1 is a layout view of the equipment used for controlling the operation of the multiple key light system and of the wiring cables extending therebetween.

Referring now to the figures, 10 represents a television or motion picture set having a scenery background 11 in front of which the actors perform. The actors are lighted by any one of a plurality of key lights 12, 13, 14, 15 and 16, while the background is generally lighted by other lights, not shown. Associated with the respective key lights 13, 14, 15 and 16 are cameras 17, 18, 19 and 20. These cameras and key lights are angled from one another to take the pictures from different directions. They may be individually turned on and off several times during a program and in doing so, their accompanying key lights must be similarly turned on and off.

The cameras are operated by a camera dissolver board 21 having cables 22, 23, 24 and 25 extending therefrom to the respective cameras 17, 18, 19 and 20. Within these cables are respectively time delay relays 26, 27, 28 and 29 to allow automatically time for the photographic key light to reach its full intensity before the camera is turned on the air. The key light bulb filament reaches its full intensity in about ⅗ of a second, and thus the camera is delayed over this period of time so that both the key light and the camera are simultaneously turned on. The standard camera dissolver board has two rows of press buttons to place the cameras on the air. The press button rows are indicated at 30, 31, 32 and 33, and at 34, 35, 36 and 37.

The press buttons operate off and on toggle switches. The press buttons 30, 34, control the camera 17, the press buttons 31, 35 control camera 18, the press buttons 32, 36 control camera 19 and the press buttons 33, 37 control the camera 20. Pilot or indicator lights 38, 39, 40, 41, 42, 43, 44 and 45 correspond respectively to press buttons 30, 31, 32, 33, 34, 35, 36 and 37 respectively and show when these respective switch buttons are pressed to the on position preparatory to changing cameras. When it is desired to dissolve from camera 17, which is already on as indicated by light 42, to another camera, the press button for the other camera is depressed in the other row, such as button 31.

Dissolver handles 46 and 47 are then pulled from the upper ends of slots 48 and 49 to the lower ends of the slots whereby camera 17 dissolves with any other camera which has been preselected in the lower row; the indicator lights are lighted to indicate the particular camera press button which is depressed. When it is desired to switch on cameras, buttons in the lower row are depressed, while the handles 46 and 47 are at the lower ends of the slots, making the lower row of buttons the "hot" row. By returning handles 46 and 47 to the top of the slots, the upper row of buttons then becomes the "hot" row.

Figures 2, 3:
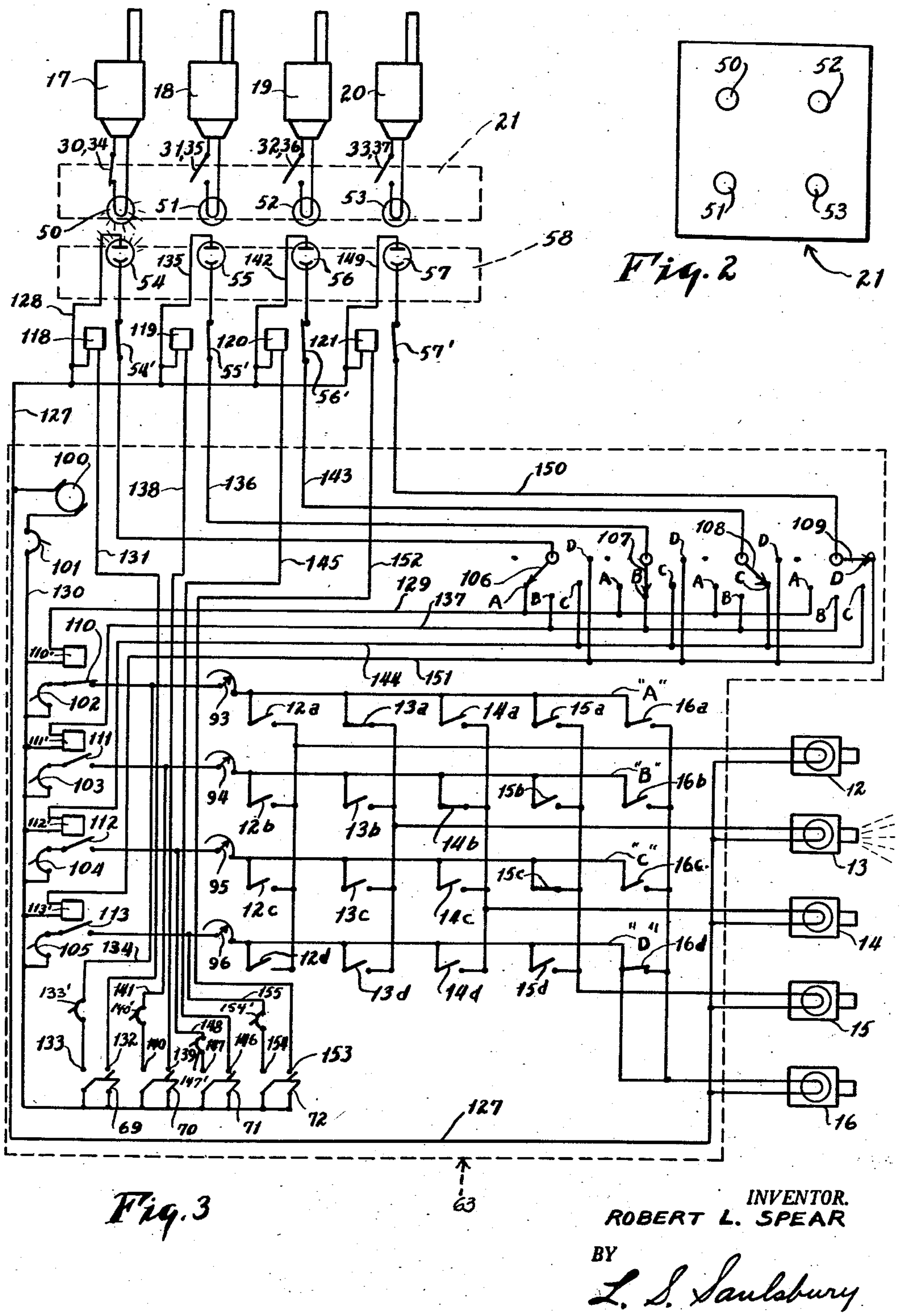
Fig. 2 is a bottom plan view of the camera dissolver looking upon the lamp bulbs.
Fig. 3 is a detail wiring diagram of the entire system including the wiring of the key light selector board.

The bottom of the camera dissolver board has four exciter lamp bulbs 50, 51, 52 and 53, arranged as shown in Fig. 2, to correspond respectively to photo-electric cells 54, 55, 56 and 57 of a photo-electric pickup device 58 on which the camera dissolver board 21 is supported to register with the exciter lamp bulbs on the underside of the same with the photo-electric cells of the photo-electric pickup device 58. This makes a connection with the camera dissolver board without electrically interfering with the camera dissolver board wiring. The key light control need not be made a part of the television technical director's function or be electrically wired with the dissolver board, because once the key light board, in a manner to be later described is set up, the key lights will be controlled automatically and in response to the usual operation and control of the cameras.

This photo-electric pickup device 58 is connected by four cables 59, 60, 61 and 62 to a key light selector board 63 that can be located also in the control room or elsewhere and preset according to a definite key lighting program. Running from this board 63 are cables 64, 65, 66, 67 and 68 that extend respectively to key lights 12, 13, 14, 15 and 16. The key light selector board which can be set in advance or during the program and the pickup device 58 will be controlled automatically with the operation of the camera dissolver board 21.

The key light selector board 63 has four manually operated toggle switches 69, 70, 71 and 72 on one end thereof by which any one or more of the camera lights 13, 14, 15 and 16 can be held lighted independently of any one camera. In addition and corresponding to these toggle switches, there are four rows of five or any number of selector switches, depending on the number of key lights and cameras being used, which may be preset, each row being operated in response to a press button on the camera dissolver board. There may be any number of rows depending on the number of cameras being used. The rows of selector switches are designed on the wiring diagram by letters "A," "B," "C" and "D."

In the wiring diagram in Fig. 3, it will be seen that respectively associated with the photo-electric cells 54, 55, 56 and 57 are respectively normally closed, magnetically-operated switch arms 54', 55', 56' and 57'. These switch arms may be respectively opened by throwing the respective switches 69, 70, 71 and 72. These switches are preferably of the double pole, single throw type. The throwing of these switches 69, 70, 71 and 72 energize respectively solenoids 118, 119, 120 and 121 to move the respective switch arms 54', 55', 56' and 57' to their open positions. This causes the photo-electric cell associated with these respective switch arms to be inoperative and accordingly a circuit passing through emergency camera rotary selector switches 106, 107, 108 and 109, photo-electric relay devices 110', 111', 112', and 113' would be interrupted. A glow from any of the lamps on the bottom of the dissolver board directed to any of the photo-electric cells will be made ineffective. These circuits will be later traced.

The normally open switch arms 110, 111, 112 and 113 which control the flow of current to row lines "A," "B," "C" or "D," corresponding to the respective cameras and to which the respective key lights are connected, will be incapacitated until the switch arms are moved to their closed positions. The respective lines "A," "B," "C" and "D" have dimmers 93, 94, 95 and 96 that control the intensity of the flow of current to the key lights. These dimmers are mounted at the top of the key light board.

The emergency camera rotary selector switches 106, 107, 108 and 109 are preset to any one of the selector lines "A," "B," "C" annd "D." Associated with each of these lines are a plurality of key light selector switches. The line "A" has key light selector switches **12*a*, 13*a*, 14*a*, 15*a* and 16*a* that respectively control the operation of the respective key lights 12, 13, 14, 15 and 16. The line "B" has selector switches 12*b*, 13, 14*b*, 15 and 16*b*, the line "C" has selector switches 12*c*, 13*c*, 14*c*, 15*c* and 16*c*, and the line "D" has selector switches 12*d*, 13*d*, 14*d*, 15*d* and 16*d* to similarly operate key lights 12, 13, 14, 15 and 16. When these light selector switches are manually closed, one or any combination of key lights can be placed on in response to any one camera that is turned on, the camera having been selected through the camera selector switches 106, 107, 108 and 109**.

As a single example, it is desired that key light 13 be turned on in response to camera 17, light 14 in response to camera 18, light 15 in response to camera 19 and light 16 in response to camera 20. Of course, any other selection of lights could be effected for the different cameras. These key light selector switches 13, **14*b*, 15*c* and 16*d*** are closed, as shown on the wiring diagram. The key lights are arranged to be turned on according to a predetermined plan worked out between the lighting director and the camera man. This is done in advance of the program, and as the cameras are turned on and off, these selected key lights will be turned "on" and "off" automatically.

When it is desired under emergency that camera 17 control the light pattern of line "B," the rotary switch 106 may be turned to contact B. If it is desired that camera 17 have the pattern of line "C," the rotary switch 106 is turned to contact C, or if it is desired that camera 17 have the pattern of line "D," the switch 106 is turned to contact D. The other rotary switches 107, 108 and 109 can be similarly set for the different row lines "A," "B," "C" and "D." The switches will normally be kept at their positions shown, but can be changed, as explained above.

As electric supply source 100 is provided for the system. A main overload circuit breaker 101 protects the main lines whereas individual overload circuit breakers 102, 103, 104 and 105 respectively protect lines "A," "B," "C" and "D."

To show how the line "A" is operated from the camera 17, the wiring will be traced. As the camera 17 is turned on, its exciter lamp bulb 50 in the bottom of the dissolver board 21 is lighted and due to the glow upon the photo-electric cell 54, the current beginning from an electric source 100 will flow through main line 127, line 128, photo-electric cell 54, relay switch arm 54', rotary switch 106, contact A, line 129, photo-electric relay device 110', other main line 130, main line circuit breaker 101, back to electric source 100. This causes relay 110' to move its associated switch arm 110 to its closed position so that current passes from main line 130 through line "A," selector switch **13*a*, light 13, back to main wire 127 and source 100. The power delivered from the other row lines "B," "C" and "D" can similarly be traced, as the cameras 18, 19 and 20** are operated.

The photo-electric circuit for the photo-electric cell 54 can be opened by closing switch 69 whereby relay solenoid 118 is operated to move switch arm 54' to its open position and the relay device 110' is de-energized to allow switch 110 to open.

Current beginning at source 100 will flow through main wire 127, solenoid 118, wire 131, contact 132, of switch 69, return main wire 130, overload circuit breaker 101, to source 100. Current can then be supplied to keep the lights turned on from main wire 130, contact 133 of the switch 69, overload circuit breaker 133', and wire 134 to line "A" whereby the key light controlled by that line can be taken out of control of the cameras and kept lighted.

A similar effect can be had by closing either of the other switches 70, 71 and 72 associated with the respective photo-electric cells 55, 56 and 57.

When camera 18 is turned on, lamp bulb 51 will energize photo-electric cell 55 and current flows from main wire 127 to wire 135, photo-electric cell 55, switch 55', wire 136, rotary switch 107, contact B, line 137, relay device 111', circuit breaker 101 and back to source 100. Switch 111 will be closed so that current will pass through line "B", switch **14*b*, to key light 14, return wire 127, circuit breaker 101 and source 100. If it is desired to keep light 14 lighted, manual switch 70 is closed so that solenoid 119 is operated to disconnect switch arm 55'. Current to this solenoid 119 is received from wire 127 and passes down wire 138 to contact 139 of switch 70 to main wire 130. Current is then supplied to line B from main wire 130 through contact 140, overload circuit breaker 140' and wire 141**.

When the camera 19 is turned on, the key light 14 will be turned off, and the key light 15 is turned on. This is effected by current passing from wire 127 to wire 142, photo-electric cell 56, switch arm 56', wire 143, rotary switch 108, contact C, wire 144, relay device 112', main wire 130, circuit breaker 101 and back to source 100. The switch 112 will be closed so that current passes through line "C", switch 15*c* to key light 15. If it is desired to hold this light on, the switch 71 is closed so that the current passes from main wire 127 to relay device 120 to open switch arm 56', wire 145, contact 146 to wire 130. The line "C" is then supplied through contact 147, circuit breaker 147' and wire 148 to line "C" to keep the key light 15 lighted.

When the camera 20 is turned on, the photo-electric cell 57 is activated. Current passes from main wire 127 to wire 149, cell 57, switch 57', wire 150, rotary switch 109, contact D, wire 151, relay device 113' and return main wire 130. The switch 113 will be closed so that current passes to line "D", selector switch 16*d* to light 16 and return wire 127. If it is desired to hold on the light 16, the switch 57 is closed. Current will then pass from main wire 127 through relay 121 to open switch 57', wire 152, contact 154, circuit breaker 154' and wire 155 to line "D".

It should be apparent that there has been provided a selector key light board for use with a key light system for television and moving pictures whereby once the key light board is set, the desired key lights will be turned on automatically in response to the operation of the camera. It will also be apparent that by operation of a manual switch, any set of lights can be maintained lighted and made non-responsive to the television camera dissolver board or the motion picture camera.

It should be further apparent that any given camera can be adjusted to operate any set of preselected lights and that any one or more of the lights can be turned on by any given camera.

While various changes may be made in the detail construction, it shall be understood that such changes shall be within the spirit and scope of the present invention as defined by the appended claims.

What is claimed is:

1. A key light control system for television and motion pictures comprising a plurality of key lights, a camera dissolver board for controlling cameras and having illumination means responsive to the operation of certain cameras, a key light selector board having a plurality of selector keys to prearrange the key lights which are to be turned on in response to a given camera being turned on, photoelectric pickup means associated with the illumination responsive means in the camera dissolver board and operable to supply current through the selector switches to the selected key lights, whereby the key lights may be operated in response to the cameras.

2. A key light system for television and motion pictures as defined in claim 1, in which said responsive means within the camera dissolver board includes lamp bulbs in the bottom of the dissolver board respectively operable in response to the operation of the respective cameras and said pickup means being adapted to lie under the camera dissolver board and having photo-electric cells arranged correspondingly to the lamp bulbs in the bottom of the camera dissolver board and respectively responsive thereto.

3. A key lighting system for television and motion pictures as defined in claim 1, and emergency camera selector switches associated with respective selector switches to select any one of the several selector keys for operation by any one of the cameras.

4. A key lighting system for television and motion pictures as defined in claim 1, and manually-operated switches operable upon the pickup means to render the pickup means unresponsive to a given camera to maintain one key light lighted independently of the operation of the cameras.

5. A key lighting system for television and motion pictures as defined in claim 1, and time delay means associated with the camera dissolver board to delay the operation of the cameras until the key lights have reached their required intensity.

References Cited in the file of this patent

UNITED STATES PATENTS

| | | |
|---|---|---|
| 1,618,816 | Davies | Feb. 22, 1927 |
| 1,957,236 | Stewart | May 1, 1934 |
| 2,658,141 | Kurland et al. | Nov. 3, 1953 |